(12) United States Patent
Hunnicutt et al.

(10) Patent No.: US 7,987,765 B2
(45) Date of Patent: Aug. 2, 2011

(54) HYDRAULIC CONTROL SYSTEM FOR HIGH FLOW APPLICATIONS IN MOTOR VEHICLES

(75) Inventors: Harry A. Hunnicutt, Austin, TX (US); Gregory P. Campau, Plymouth, MI (US); Dirk Kesselgruber, Montabaur (DE)

(73) Assignee: Lucas Automotive GmbH (DE)

( * ) Notice: Subject to any disclaimer, the term of this patent is extended or adjusted under 35 U.S.C. 154(b) by 738 days.

(21) Appl. No.: 11/662,013

(22) PCT Filed: Sep. 5, 2005

(86) PCT No.: PCT/EP2005/009524
§ 371 (c)(1),
(2), (4) Date: Apr. 21, 2008

(87) PCT Pub. No.: WO2006/027190
PCT Pub. Date: Mar. 16, 2006

(65) Prior Publication Data
US 2008/0257434 A1    Oct. 23, 2008

(30) Foreign Application Priority Data
Sep. 6, 2004    (DE) .................... 20 2004 013 836 U

(51) Int. Cl.
*B60G 17/015*    (2006.01)
*B62D 5/00*    (2006.01)

(52) U.S. Cl. .................................... 91/461; 280/124.159
(58) Field of Classification Search .................... 91/433, 91/461; 280/124.16, 124.159
See application file for complete search history.

(56) References Cited

U.S. PATENT DOCUMENTS

| | | |
|---|---|---|
| 5,072,802 A | 12/1991 | Tischer |
| 5,261,455 A | 11/1993 | Takahashi et al. |
| 5,265,913 A | 11/1993 | Scheffel |
| 5,735,540 A * | 4/1998 | Schiffler ................. 280/124.157 |

FOREIGN PATENT DOCUMENTS

| | | |
|---|---|---|
| DE | 38 39 786 | 6/1989 |
| DE | 41 39 497 A1 | 6/1992 |
| DE | 41 15 595 A1 | 11/1992 |
| DE | 43 16 951 | 11/1994 |
| JP | 02063911 A | 3/1990 |
| JP | 02234825 A | 9/1990 |
| JP | 5124409 A | 5/1993 |
| WO | WO 03/101768 A1 | 12/2003 |
| WO | WO 03101768 A1 * | 12/2003 |
| WO | WO 2005/108128 A2 | 11/2005 |

* cited by examiner

*Primary Examiner* — Thomas E Lazo
(74) *Attorney, Agent, or Firm* — MacMillan, Sobanski & Todd, LLC

(57) ABSTRACT

A hydraulic control system for high flow applications in motor vehicles, in particular for active wheel suspensions and active steering arrangements, includes at least one passive high flow valve which is controlled hydraulically by at least one low flow valve.

2 Claims, 2 Drawing Sheets

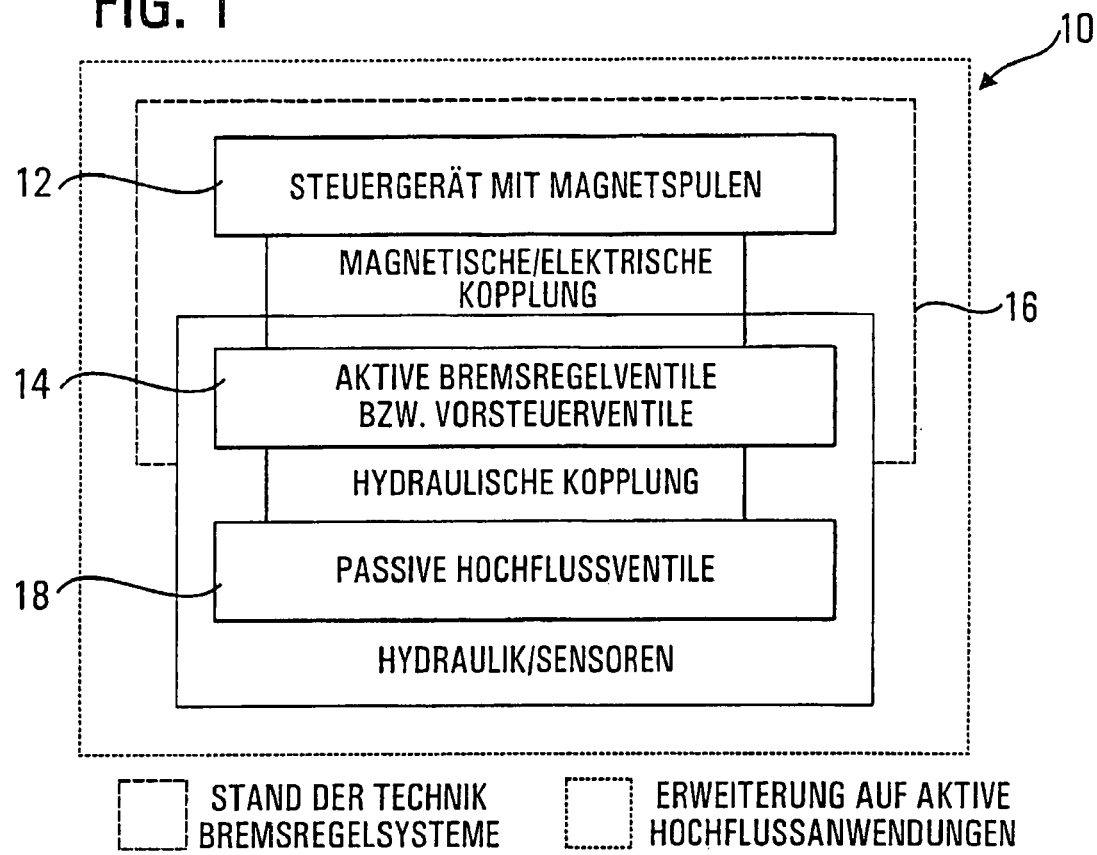
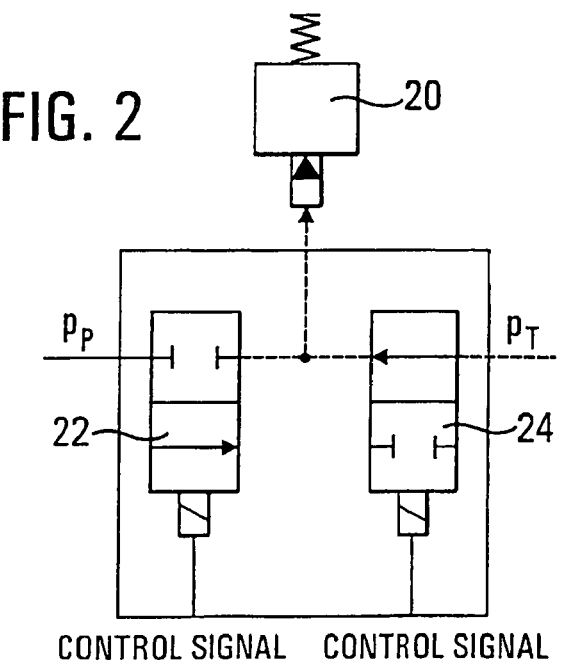

HYDRAULIC CONTROL SYSTEM FOR HIGH FLOW APPLICATIONS IN MOTOR VEHICLES

CROSS-REFERENCES TO RELATED APPLICATIONS

This application is a national stage of International Application No. PCT/EP2005/009524 filed Sep. 5, 2005, the disclosures of which are incorporated herein by reference, and which claimed priority to German Patent Application No. DE 20 2004 013 836.0 filed Sep. 6, 2004, the disclosures of which are incorporated herein by reference.

BACKGROUND OF THE INVENTION

The invention relates to a hydraulic control system for high flow applications in motor vehicles.

For the hydraulic actuation of actuators which are used in motor vehicles with active wheel suspension (active chassis) and/or active steering, special high flow valves are used because of the high oil flow requirements. On the other hand, in control systems for brake regulation applications such as ABS (anti-blocking system), ESP (electronic stability program) or EHB (electro-hydraulic brake system), valves are used which, owing to the broad distribution of the said applications (partially already standard equipment in many vehicles) are able to be produced in large numbers and hence at a favourable price. Such brake regulation valves are, however, not designed for high oil flows and are therefore not suitable for high flow applications.

It is an object of the invention to provide a possibility for designing hydraulic control systems for high flow applications in motor vehicles at a more favourable cost.

BRIEF SUMMARY OF THE INVENTION

According to the invention, a hydraulic control system for high flow applications in motor vehicles, in particular for active wheel suspensions and active steering arrangements, includes at least one passive high flow valve which is controlled hydraulically by at least one low flow valve. Through the use of low flow valves, in accordance with the invention, as pilot valves with which passive high flow valves are controlled, the costs for a control system for high flow applications, in particular for active chassis, can be distinctly reduced. The invention makes use of the fact that low flow valves are offered at a favourable cost as a "package" with integrated control apparatus (e.g. for brake regulation applications). The low flow valves are coupled magnetically and/or electrically to the control apparatus. Such a package can be extended according to the invention in a simple manner by the passive high flow valves, in that the latter are coupled hydraulically to the low flow valves. On the basis of such a structure in accordance with the invention, various tasks of a hydraulic control arrangement can be realized.

Other advantages of this invention will become apparent to those skilled in the art from the following detailed description of the preferred embodiments, when read in light of the accompanying drawings.

BRIEF DESCRIPTION OF THE DRAWINGS

FIG. 1 shows the logic structure of a hydraulic control system for high flow applications according to the invention;

FIG. 2 shows an example application for the control system according to the invention.

DETAILED DESCRIPTION OF THE INVENTION

Figure 3:
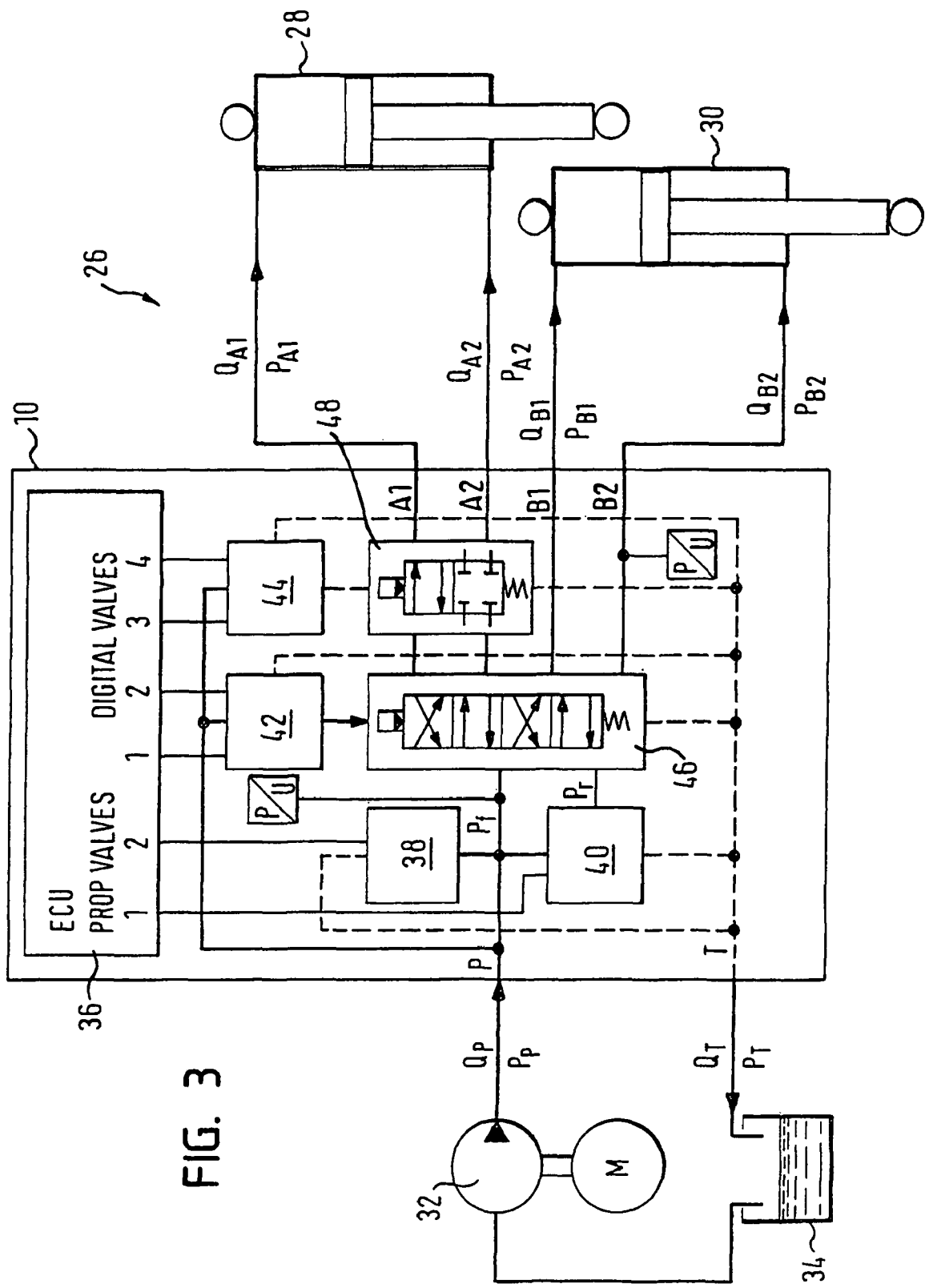
FIG. 3 shows a hydraulic pressure regulating device for an active chassis regulating system with a hydraulic control system according to the invention.

The structure illustrated in FIG. 1 shows the structure of a hydraulic control system 10 according to the invention. A control apparatus 12 and low flow valves 14 coupled thereto represent a package 16 for brake regulating applications. This package 16 with two levels is extended by a third level, namely the passive high flow valves 18. The passive high flow valves 18 are coupled hydraulically to the low flow valves 14, so that the passive high flow valves 18 can be controlled hydraulically by the low flow valves 14. The low flow valves 14 therefore serve as pilot valves for the passive high flow valves 18. The extended package 16 in accordance with the invention is therefore basically able to be used for active high flow applications.

FIG. 2 shows how, for example, an oil flow can be controlled with the control system 10 according to the invention. The oil flow is adjusted by means of a passive high flow valve in the form of a slide valve 20. The passive slide valve 20 is controlled by means of two low flow valves. The low flow valves are two 2/2-way valves 22, 24, which are otherwise used as ABS valves. The first valve is a "normally closed" valve, which is arranged in a pressure line in which a system pressure $p_P$ prevails. The second valve 24 is a "normally open" valve, which is arranged in a return line to a tank in which a tank pressure $p_T$ prevails. By means of a control apparatus (not illustrated here) the two 2/2-way valves 22, 24 can be set simultaneously into the respectively other switching state. Through this pre-control, the control surface of the passive slide valve 20 can therefore be acted upon by means of the two 2/2-way valves either with the system pressure $p_P$ or with the tank pressure $p_T$. This control can be applied to any n/2-way slide valves. Through an extending to four 2/2-way valves, in addition n/3-way slider functions can be realized.

A control system 10 according to the invention can also be used for regulating a pressure. Thus, for example, a proportionally acting brake regulating valve (proportional brake regulating valve), as is known from EHB- or ESP applications, can control a passive proportional pressure control valve or a proportional pressure reducing valve. In this case, the pressure control valve or the pressure reducing valve is in equilibrium with the brake regulating valve. For regulating a pressure circuit, an active proportional brake regulating valve with a passive proportional pressure control valve is necessary. For the regulating of n pressure circuits, an active proportional brake regulating valve with a passive proportional pressure limiting valve and n active proportional brake regulating valves with n passive proportional pressure reducing valves are necessary.

Through combination of the functions achievable with a control system 10 according to the invention, in particular the pressure regulation and the controlling of passive high flow valves, also complex device controls can be realized. In FIG. 3, as a further example application, a hydraulic pressure regulating device 26 is illustrated, with which front and rear actuators 28 and 30, respectively, of a vehicle chassis can be actuated. The pressure regulating device 26 comprises a motor-driven pump 32 which conveys hydraulic oil from a tank 34, and a hydraulic control system 10 according to the invention with respectively two connections A1, A2 and B1, B2 for each actuator 28, 30 and also a return line to the tank 34. A control apparatus 36 of the control system 10 controls a proportional pressure control valve 38 and a proportional pressure reducing valve 40 and also two 2/2-way valves 42, 44. The two 2/2-way valves 42, 44 serve as pre-control valves for a direction control valve arrangement 46, with which the direction of the actuator movement is established, and for a blocking valve arrangement 48, with which the front actuator 28 can be blocked. Both the proportional valves 38, 40 and also the 2/2-way valves 42, 44 are active low flow valves, whereas the direction control valve arrangement 46 and the blocking valve arrangement 48, which can also be replaced by a similar valve arrangement, are formed from passive high flow valves.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A hydraulic pressure regulating device for an active chassis regulating system comprising:
    front and rear actuators for the vehicle chassis;
    a hydraulic control system for actuating the front and rear actuators, the hydraulic control system including:
        two low flow valves,
        a direction control valve arrangement and a blocking valve arrangement coupled to the direction control valve arrangement, the direction control valve arrangement and the blocking valve arrangement being formed from passive high flow valves,
        and two connections for each of the front and rear actuators;
    wherein the two low flow valves hydraulically control the direction control valve arrangement and the blocking valve arrangement, respectively,
    the connections of the front and rear actuators being coupled to the direction control valve arrangement for establishing a direction of an actuator movement for each actuator, and
    the blocking valve arrangement being arranged between the connections for the front actuator and the direction control valve arrangement for blocking the front actuator.

2. A hydraulic pressure regulating device for an active chassis regulating system comprising:
    front and rear actuators for the vehicle chassis;
    a hydraulic control system for actuating the front and rear actuators, the hydraulic control system including:
        two low flow valves,
        a direction control valve arrangement and a blocking valve arrangement coupled to the direction control valve arrangement,
        and two connections for each of the front and rear actuators;
    wherein the two low flow valves hydraulically control the direction control valve arrangement and the blocking valve arrangement, respectively,
    the connections of the front and rear actuators being coupled to the direction control valve arrangement for establishing a direction of an actuator movement for each actuator, and
    the blocking valve arrangement being arranged between the connections for the front actuator and the direction control valve arrangement for blocking the front actuator.

* * * * *